US006988481B2

(12) United States Patent  
Sen et al.

(10) Patent No.: US 6,988,481 B2  
(45) Date of Patent: Jan. 24, 2006

(54) CONTROL SYSTEM FOR CYLINDER CUT-OFF INTERNAL COMBUSTION ENGINE

(75) Inventors: Naoto Sen, Wako (JP); Tadayoshi Okada, Wako (JP); Akira Sugiyama, Wako (JP); Kenichi Nishida, Wako (JP); Yasuhiko Tomokuni, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 17 days.

(21) Appl. No.: 10/844,033

(22) Filed: May 11, 2004

(65) Prior Publication Data

US 2004/0231634 A1 Nov. 25, 2004

(30) Foreign Application Priority Data

May 16, 2003 (JP) .............................. 2003-138720

(51) Int. Cl.  
*F02D 17/00* (2006.01)

(52) U.S. Cl. .................... 123/198 F; 123/349
(58) Field of Classification Search ............ 123/198 F, 123/338.19, 349, 350, 351, 352, 359, 364, 123/394, 319, 339.1, 339.16  
See application file for complete search history.

(56) References Cited

U.S. PATENT DOCUMENTS

| | | | | |
|---|---|---|---|---|
| 4,742,462 A | * | 5/1988 | Fujimori et al. | ............. 701/111 |
| 5,267,541 A | * | 12/1993 | Taguchi et al. | ........... 123/198 F |
| 6,341,594 B1 | * | 1/2002 | Linden | ........................ 123/352 |
| 6,470,851 B1 | * | 10/2002 | DeGroot et al. | ............ 123/323 |
| 6,484,686 B1 | * | 11/2002 | Ordanic | ................. 123/198 F |
| 6,619,258 B2 | * | 9/2003 | McKay et al. | ............... 123/350 |
| 6,655,353 B1 | * | 12/2003 | Rayl | .......................... 123/436 |
| 2003/0131820 A1 | * | 7/2003 | McKay et al. | ........... 123/198 F |
| 2005/0065709 A1 | * | 3/2005 | Cullen | ........................ 701/112 |

FOREIGN PATENT DOCUMENTS

| | | |
|---|---|---|
| JP | 54-133222 | 10/1979 |
| JP | 05-071634 | 3/1993 |
| JP | 09-290665 | 11/1997 |
| JP | 10-103097 | 4/1998 |

\* cited by examiner

*Primary Examiner*—Henry C. Yuen  
*Assistant Examiner*—Jason Benton  
(74) *Attorney, Agent, or Firm*—O'Melveny & Myers LLP

(57) ABSTRACT

In a control system for an internal combustion engine having a plurality of cylinders whose operation of the engine can be switched between full-cylinder operation during which all of the cylinders are operative and cut-off-cylinder operation during which some of the cylinders are non-operative, and running control, i.e., either cruise control during which the vehicle is controlled to run at a desired vehicle velocity or preceding vehicle follow-up control during which the vehicle is controlled to run at a desired vehicle velocity to maintain a desired inter-vehicle distance from a preceding vehicle, is performed in response to an instruction of an operator, it is judged whether a velocity error between a detected vehicle velocity and the desired vehicle velocity and load of the engine are equal to or smaller than corresponding threshold values. If the result is affirmative when the running control is in progress, it is determined that running condition of the vehicle is stable and the engine operation is switched to the cut-off-cylinder operation, thereby preventing a control hunting from happening, while ensuring to improve fuel consumption by utilizing the cut-off-cylinder operation as much as possible.

22 Claims, 6 Drawing Sheets

CONTROL SYSTEM FOR CYLINDER CUT-OFF INTERNAL COMBUSTION ENGINE

BACKGROUND OF THE INVENTION

1. Field of the Invention

This invention relates to a control system for a cylinder cut-off internal combustion engine of a vehicle wherein a fuel supply to some of the cylinders is cut off.

2. Description of the Related Art

In a conventional multi-cylinder internal combustion engine having a plurality of cylinders, it has been proposed to improve fuel consumption by switching engine operation, based on the engine load, between full-cylinder operation during which all of the cylinders are supplied with fuel to be operative and cut-off-cylinder operation during which the fuel supply to some of the cylinders are cut-off or stopped to be non-operative. In this type of engine, since shock is occasionally generated due to the fluctuation of torque during engine operation changeover, it has also been proposed to eliminate shock by adjusting throttle opening during a transitional period of changeover, as taught in Japanese Laid-Open Patent Application No. Hei 10 (1998)-103097, for example.

It is also known to perform running control to control the vehicle to cruise at a desired vehicle velocity set by the operator. A similar preceding vehicle follow-up control (so-called "adaptive cruise control") is known wherein the vehicle is controlled to detect the distance between itself and a preceding vehicle using a radar or the like, and to travel while maintaining a desired inter-vehicle distance between itself and the preceding vehicle. In these types of control, the vehicle velocity or inter-vehicle distance when the operator manipulates a corresponding setting switch is stored as a desired velocity or distance, and throttle opening is adjusted via an actuator such that the vehicle runs at the stored desired velocity or the vehicle runs at a desired velocity necessary for maintaining the desired inter-vehicle distance between itself and the preceding vehicle, as disclosed, e.g., in Japanese Laid-Open Patent Application No. Hei 9 (1997)-290665.

Moreover, it has also been proposed to raise a threshold value in a cylinder cut-off engine, when cruise control is in progress, such that engine operation is likely to be switched to cut-off-cylinder operation, as disclosed, e.g., in Japanese Patent Publication Sho 58(1983)-17338.

In such a cylinder cut-off engine, engine operation is switched between full-cylinder operation and cut-off-cylinder operation based on at least throttle opening operated in response to the operator's accelerator manipulation, engine speed and manifold absolute pressure, etc. Generally, in cruise control, in response to a drop in vehicle velocity, the throttle valve is moved by an actuator more finely and more quickly than done by the operator's manipulation.

Accordingly, when vehicle velocity drops after being switched from full-cylinder operation to cut-off-cylinder operation, or when vehicle velocity drops during cut-off-cylinder operation due to change in road gradient (slope), throttle opening is quickly controlled. However, since engine torque is normally insufficient at that situation, the vehicle velocity does not rise immediately and the throttle valve is liable to be opened excessively. This excessive opening of the throttle valve is a mere temporal event. Nevertheless, when engine operation switchover is determined based on the parameters including the throttle opening, this sometimes makes it difficult to switch engine operation to cut-off-cylinder operation to improve fuel consumption.

Moreover, in the case that engine operation switchover is determined based on the parameters including the throttle opening, when cruise control is in progress, engine operation is switched to cut-off-cylinder operation in response to a momentary throttle opening closing control, but is returned to full-cylinder operation if the throttle valve is again controlled to an opening direction, thereby occasionally producing a control hunting. In the technology mentioned in '338, it is proposed to raise a threshold value in a cylinder cut-off engine, when cruise control is in progress, such that engine operation is likely to be switched to cut-off-cylinder operation. However, since this technology only proposes to raise the threshold value, it can not always cope with running condition where the vehicle runs actually and hence, can not avoid frequent engine operation changeover.

SUMMARY OF THE INVENTION

It is therefore an object of this invention to eliminate the defects described above and to provide a control system for a cylinder cut-off internal combustion engine, whose operation change switched between full-cylinder operation and cut-off-cylinder operation, that determines a stable running condition when running control is in progress, thereby enabling to continue cut-off-cylinder operation as long as possible so as to improve fuel consumption, while preventing a control hunting from happening.

In an aspect of the invention, there is provided a system for controlling an internal combustion engine having a plurality of cylinders and mounted on a vehicle, operation of the engine being switchable, based on at least load of the engine, between full-cylinder operation during which all of the cylinders are operative and cut-off-cylinder operation during which some of the cylinders are non-operative, and having a running controller that performs running control including at least one of cruise control during which the vehicle is controlled to run at a desired vehicle velocity and preceding vehicle follow-up control during which the vehicle is controlled to run at a desired vehicle velocity to maintain a desired inter-vehicle distance from a preceding vehicle, in response to an instruction of an operator, comprising: velocity error determiner that determines whether a velocity error between a detected vehicle velocity and the desired vehicle velocity is equal to or smaller than a velocity error threshold value; load determiner that determines whether load of the engine is equal to or smaller than a load threshold value; running condition determiner that determines that running condition of the vehicle is stable when the velocity error is equal to or smaller than the velocity error threshold value and when the load of the engine is equal to or smaller than the load threshold value; and engine operation controller that controls to switch the operation of the engine to the cut-off-cylinder operation if the running condition of the vehicle is determined to be stable when the running control is performed by the running controller.

BRIEF DESCRIPTION OF THE DRAWINGS

The above and other objects and advantages of the invention will be more apparent from the following description and drawings, in which.

DESCRIPTION OF THE PREFERRED EMBODIMENT

A control system for a cylinder cut-off internal combustion engine according to an embodiment of this invention will be described below with reference to the attached drawings.

Figure 1:
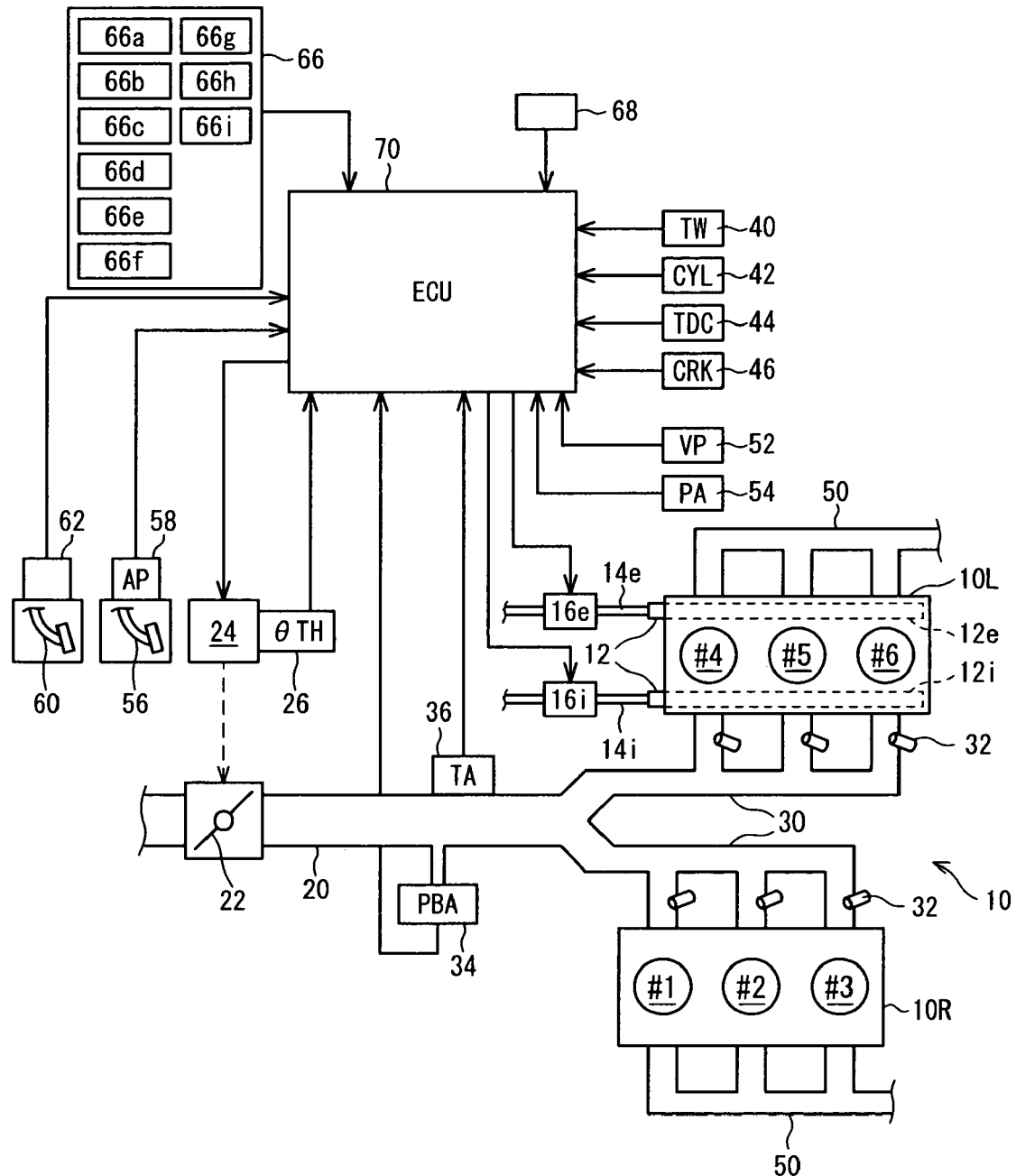
FIG. 1 is a schematic diagram showing the overall structure of a control system for a cylinder cut-off internal combustion engine according to an embodiment of this invention.

FIG. 1 is a schematic diagram showing the overall structure of a control system for a cylinder cut-off internal combustion engine according to the embodiment.

The reference symbol 10 in the drawing indicates a multi-cylinder internal combustion engine (to be referred to as "engine" below). The engine 10 is constituted as a four-cycle V-type six-cylinder DOHC engine having three cylinders #1, #2, #3 on a right bank 10R and three cylinders #4, #5, #6 on a left bank 10L. A cylinder cut-off mechanism 12 is provided on the left bank 10L of the engine 10.

The cylinder cut-off mechanism 12 comprises an intake side cut-off mechanism 12i for cutting off (closing) the intake valves (not shown) of the cylinders #4 through #6, and an exhaust side cut-off mechanism 12e for cutting off (closing) the exhaust valves (not shown) of the cylinders #4 through #6. The intake side cut-off mechanism 12i and exhaust side cut-off mechanism 12e are connected to a hydraulic pump (not shown) via respective oil passages 14i and 14e. Linear solenoids (electromagnetic solenoids) 16i and 16e are disposed at a point on the oil passages 14i and 14e respectively to supply oil pressure or block the supply thereof to the intake side cut-off mechanism 12i and exhaust side cut-off mechanism 12e.

The oil passage 14i of the intake side cut-off mechanism 12i is opened when the linear solenoid 16i is deenergized, and when oil pressure is supplied, the contact between the intake valves and intake cams (not shown) of the cylinders #4 through #6 is released such that the intake valves enter a cut-off state (closed state). The oil passage 14e is opened when the linear solenoid 16e is deenergized, and when oil pressure is supplied to the exhaust side cut-off mechanism 12e, the contact between the exhaust valves and exhaust cams (not shown) of the cylinders #4 through #6 is released such that the exhaust valves enter the cut-off state (closed state). As a result, operations of the cylinders #4 through #6 are cut off, and the engine 10 enters cut-off-cylinder operation in which the engine 10 is operated by the cylinders #1 through #3 alone. In this state, the supply of fuel to the cylinders #4 through #6 are cut-off or stopped and become non-operative, so as to improve fuel consumption.

Conversely, when the linear solenoid 16i is energized such that the oil passage 14i closes and the supply of hydraulic fluid to the intake side cut-off mechanism 12i is blocked, the intake valves and intake cams of the cylinders #4 through #6 come into contact, and the intake valves enter an operative state (so as to be opened/closed).

When the linear solenoid 16e is energized such that the oil passage 14e closes and the supply of hydraulic fluid to the exhaust side cut-off mechanism 12e is blocked, the exhaust valves and exhaust cams (not shown) of the cylinders #4 through #6 come into contact, and the exhaust valves enter an operative state (so as to be opened/closed). As a result, the cylinders #4 through #6 are operated and the engine 10 enters full-cylinder operation wherein all of the cylinders are supplied with fuel and operative. Thus, the engine 10 is constituted as cylinder cut-off engine (internal combustion engine) which is capable of switching between full-cylinder operation and cut-off-cylinder operation.

A throttle valve 22 is disposed on an intake pipe 20 of the engine 10 to adjust the amount of intake air. The throttle valve 22 is connected to an electric motor 24 such that the mechanical coupling with the accelerator pedal is severed, and is driven by the electric motor 24 to open and close. A throttle position sensor 26 is provided in the vicinity of the electric motor 24 and outputs a signal corresponding to the position or opening (to be referred to later as "throttle opening") θTH of the throttle valve 22 in accordance with the amount of rotation of the electric motor 24.

Injectors (fuel injection valves) 32 are provided respectively in the vicinity of the intake ports of each cylinder #1 through #6 immediately after an intake manifold 30 disposed downstream of the throttle valve 22. The injectors 32 are connected to a fuel tank via a fuel supply pipe and a fuel pump (none of which are shown in the drawings), and is supplied with pressurized gasoline fuel from the fuel tank for injection.

A manifold absolute pressure sensor 34 and an intake air temperature sensor 36 are provided on the downstream side of the throttle valve 22 of the intake pipe 20 so as to output signals indicating a manifold absolute pressure (indicative of the engine load) PBA and an intake air temperature TA respectively. An engine coolant temperature sensor 40 is attached to a cooling water passage (not shown) of the cylinder blocks of the engine 10 so as to output a signal corresponding to an engine coolant temperature TW.

A cylinder discrimination sensor 42 is attached in the vicinity of the camshaft or crankshaft (not shown) of the engine 10, and outputs a cylinder discrimination signal CYL at a predetermined crank angle position of a specific cylinder (for example, #1). A TDC sensor 44 and a crank angle sensor 46 are also attached to the camshaft or crankshaft of the engine 10, and respectively output a TDC signal at a predetermined crank angle position relating to the TDC position of the piston of each cylinder and a CRK signal at shorter crank angle intervals (for example, thirty degrees) than the TDC signal.

The engine 10 is connected to an exhaust pipe (not shown) via an exhaust manifold 50, and the exhaust gas that is produced during combustion is discharged outside while being purified by a catalytic converter (not shown) provided at a point on the exhaust pipe. A vehicle velocity sensor 52 is disposed in the vicinity of a driveshaft (not shown), and outputs a signal at every predetermined rotation of the driveshaft. An atmospheric pressure sensor 54 is disposed in an appropriate position in the engine room (not shown), and outputs a signal indicating the atmospheric pressure PA at the location in which the vehicle is positioned.

An accelerator position sensor 58 is disposed in the vicinity of an accelerator pedal 56 which is installed on the floor surface of the operator's seat of the vehicle, and outputs a signal corresponding to a position (depression amount or accelerator opening) AP of the accelerator pedal 56 that is operated by the operator. A brake switch 62 is provided in the vicinity of a brake pedal 60, and outputs an ON signal when the operator depresses (manipulates) the brake pedal 60 to operate the brake.

A group of auto-cruise switches (generally assigned with reference numeral 66) is provided in the vicinity of a steering wheel (not shown) which is provided at the operator's seat of the vehicle.

The group of auto-cruise switches 66 is manipulated by the operator, and comprises various switches for inputting operator's instructions such as a desired vehicle velocity during running control. More specifically, this switch group comprises a setting switch 66a for inputting an instruction to perform cruise control and a desired vehicle velocity, a resume switch 66b for resuming running control after running control has been interrupted by a brake operation or the like, a cancel switch 66c for canceling (ending) running control, an accelerate switch (a vehicle velocity increasing switch for inputting an instruction to increase the desired vehicle velocity) 66d for inputting an instruction to perform acceleration control in order to accelerate the vehicle velocity, a decelerate switch (a vehicle velocity decreasing switch for inputting an instruction to reduce the desired vehicle velocity) 66e for inputting an instruction to perform deceleration control in order to decelerate the vehicle velocity, a main switch 66f for enabling manipulation of the switches described above to be effective, a desired inter-vehicle distance setting switch 66g for inputting an instruction to perform preceding vehicle follow-up control (inter-vehicle distance control) and a desired inter-vehicle distance, a desired inter-vehicle distance increasing switch (inter-vehicle distance increasing switch) 66h for increasing the desired inter-vehicle distance, and a desired inter-vehicle distance decreasing switch (inter-vehicle distance decreasing switch) 66i for decreasing the desired inter-vehicle distance.

It should be noted that the switches described above may be disposed individually, or may be designed such that a plurality of instructions can be inputted by a combination of manipulations. Switches may be integrated such that when, for example, the setting switch is manipulated during execution of running control, a cancellation is indicated, and so on.

A radar 68 is provided in an appropriate position on the front bumper (not shown) or the like facing frontward of the vehicle. The radar 68 has a transmission unit and a reception unit (neither shown), such that electromagnetic waves are emitted frontward of the vehicle from the transmission unit and reflected by the preceding vehicle or the like. The reflected electromagnetic waves (reflected waves) are then received by the reception unit, whereby obstructions such as preceding vehicles are detected.

The outputs of the various sensors and switches described above are transmitted to an ECU (Electronic Control Unit) 70.

The ECU 70 is constituted as a microcomputer comprising a CPU for performing control calculations, a ROM for storing a control calculation program and various data (tables and the like), a RAM for storing control calculation results from the CPU and so on temporarily, an input circuit, an output circuit, and a counter (none of which are shown in the drawing).

The ECU 70 detects the engine speed NE by counting the CRK signals outputted by the crank angle sensor 46 by the counter, and detects the vehicle velocity VP indicating the traveling velocity (speed) of the vehicle by counting the signals outputted by the vehicle velocity sensor 52 by the counter. The ECU 70 also detects the inter-vehicle distance and relative velocity of the subject vehicle and a preceding vehicle based on the signals from the radar 68, and calculates the desired vehicle velocity from the detected values.

Based on the inputted values, the ECU 70 executes calculations to determine a fuel injection amount in order to open the injector 32, and to determine an ignition timing in order to control the operation of an ignition device (not shown). Also on the basis of the inputted values, the ECU 70 determines a rotation amount (operating amount) of the electric motor 24 such that the throttle opening θTH is moved to a desired throttle opening THCC, and determines whether or not to energize the solenoids 16i, 16e in order to switch operations of the engine 10 between full-cylinder operation and cut-off-cylinder operation.

The ECU 70 also performs running control on the basis of the inputted values, more specifically performs cruise control to cause the vehicle to run at the desired vehicle velocity set by the operator and preceding vehicle follow-up control (inter-vehicle distance control) to cause the vehicle to run while maintaining a predetermined inter-vehicle distance between itself and a preceding vehicle.

As will be explained below, the ECU 70 acts as an engine operation controller that performs switching control of engine operation based on at least the load of the engine (θTH) between full-cylinder operation during which all of the cylinders are supplied with fuel and operative and cut-off-cylinder operation during which the fuel supply to some of the cylinders are cut-off or stopped and are non-operative, a running controller that performs a running control including at least one of a cruise control in which the vehicle runs at a desired vehicle velocity and a preceding vehicle follow-up control in which the vehicle runs at a desired vehicle velocity to maintain a desired inter-vehicle distance from a preceding vehicle.

Next, operations of the control system for a cylinder cut-off internal combustion engine according to this embodiment will be described with reference to FIG. 2 onward.

Figure 2:
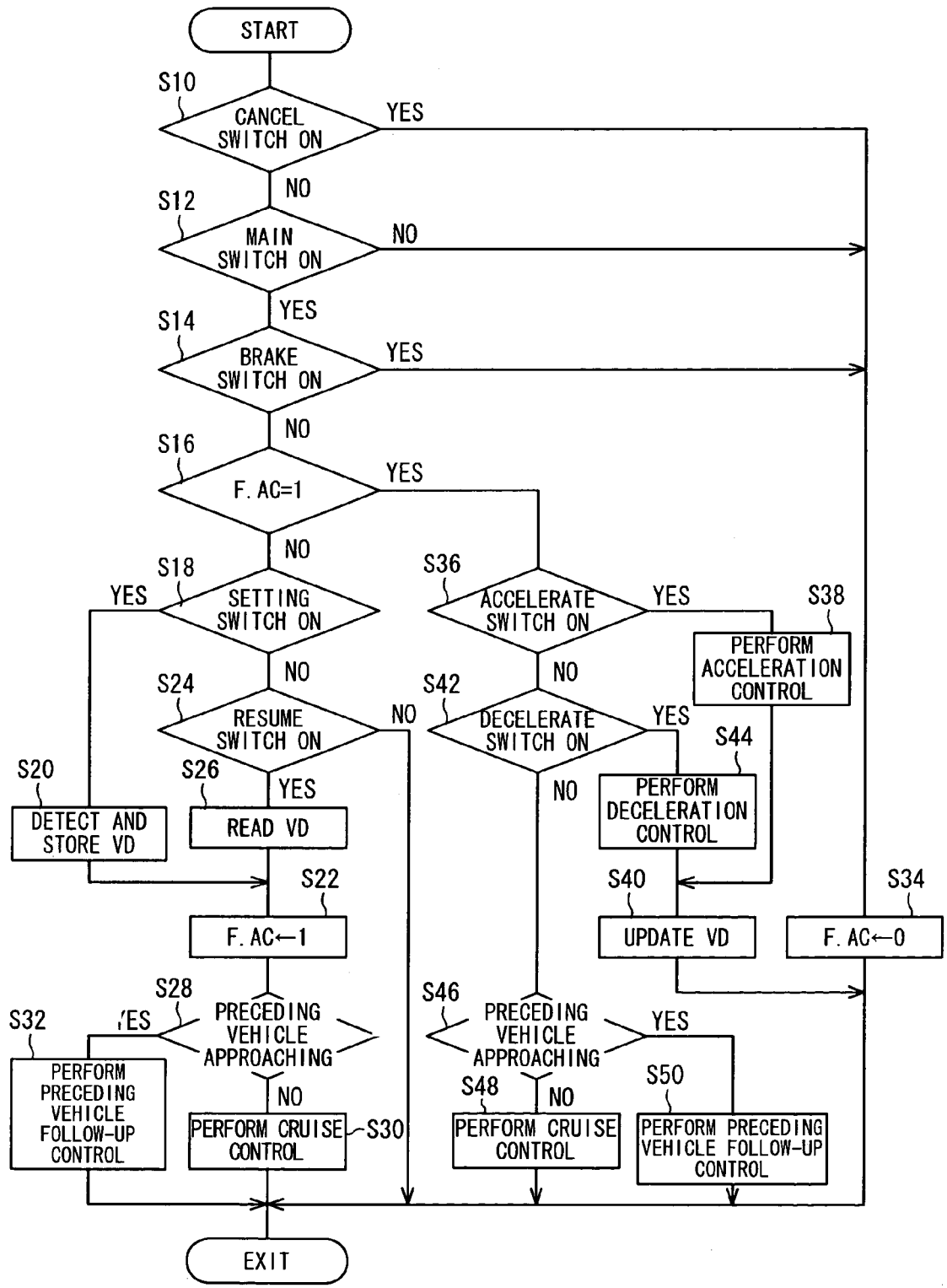
FIG. 2 is a flow chart showing an operation for performing running control from among of the operations of the system shown in FIG. 1.

FIG. 2 is a flow chart showing an operation for performing running control, more specifically for cruise control and preceding vehicle follow-up control from among of the operations of the system shown in FIG. 1. The program shown in the diagram is executed (looped) at TDC (Top Dead Center) or a predetermined crank angle, or at predetermined time intervals, for example.

The program begins in S10 in which it is determined whether the cancel switch 66c is ON, or in other words whether a running control cancellation (end) instruction has been inputted by the operator. If the determination result is negative, the program proceeds to S12 in which it is determined whether the main switch 66f is ON. If the determination result in S12 is affirmative, the program proceeds to S14 in which it is determined whether or not the brake switch 62 is ON, or in other words whether the brake pedal 60 has been depressed by the operator.

If the determination result in S14 is negative, the program proceeds to S16 in which it is determined whether the bit of a flag F.AC is set to 1. The bit of the flag F.AC (having an initial value of 0) is set to 1 in a subsequent step and when the bit is set to 1, it indicates that running control, in other words cruise control or preceding vehicle follow-up control (including acceleration and deceleration control performed by switch operation), in which the accelerator pedal 56 and brake pedal 60 need not be manipulated by the operator, is in progress. When the determination result in S16 is negative, the program proceeds to S18 in which it is determined whether the setting switch 66a is ON, or in other words whether an instruction to perform running control and a desired vehicle velocity have been inputted by the operator.

If the determination result in S18 is affirmative, the program proceeds to S20 in which the desired vehicle velocity VD inputted through the setting switch 66a is detected (read) and stored, and then proceeds to S22 in which the bit of the flag F.AC is set to 1.

If the determination result in S18 is negative, the program proceeds to S24 in which a determination is made as to whether or not the resume switch 66b is ON, or in other words whether an instruction to resume running control has been inputted by the operator following the cancellation of running control (when the bit of the flag F.AC is reset to 0) caused by a brake manipulation. If the determination result of S24 is affirmative, the program proceeds to S26 in which the desired vehicle velocity VD stored before the bit of the flag F.AC was reset to 0 is read, and then proceeds to S22. When the determination result in S24 is negative, the bit of the flag F.AC is held at 0, and the program is terminated without restarting running control.

Next, the program proceeds to S28 in which it is determined whether a preceding vehicle is approaching within a predetermined (desired) inter-vehicle distance. If the determination result in S28 is negative, the program proceeds to S30 in which cruise control is performed based on the stored desired vehicle velocity VD. More specifically, the amount of current supply (the manipulated variable, more precisely a current supply command value to the electric motor 24 for moving the throttle valve 22) is calculated based on the difference between the desired vehicle velocity VD and the current (detected) velocity VP using a PID control law or the like, whereupon this amount is outputted to the electric motor 24 to control the throttle opening $\theta$TH. It should be noted that when deceleration of a predetermined level or greater which cannot be responded to adequately by the throttle opening control is required during cruise control, a brake operation or a gear change (downshift) is performed in conjunction with the throttle opening control to drive the same in a closing direction.

If the determination result in S28 is affirmative, the program proceeds to S32 in which preceding vehicle follow-up control is performed. More specifically, the throttle opening $\theta$TH is reduced to decrease the vehicle velocity and maintain the distance between the vehicle itself and the preceding vehicle, detected by the radar 68, at the preset desired inter-vehicle distance. It should also be noted that when similar deceleration of a predetermined level or greater which cannot be responded to adequately by adjusting the throttle opening is required during preceding vehicle follow-up control, a brake operation or a gear change (downshift) is also performed in conjunction with adjustment of the throttle opening in a closing direction.

If, on the other hand, the determination result is affirmative in S10 or S14, or negative in S12, the program proceeds to S34 in which the bit of the flag F.AC is reset to 0. When the determination result is affirmative in S16, or in other words when running control is in progress, the program proceeds to S36 in which a determination is made as to whether or not the accelerate switch 66d is ON, or in other words whether an acceleration request has been manipulated by the operator.

When the determination result in S36 is affirmative, the program proceeds to S38 in which acceleration control is performed to increase the throttle opening $\theta$TH such that the vehicle velocity is increased at a constant acceleration. The program then proceeds to S40 in which the desired vehicle velocity VD is updated to the velocity following the acceleration. If, on the other hand, the determination result in S36 is negative, the program proceeds to S42 in which it is determined whether the decelerate switch 66e is ON, or in other words whether the deceleration instruction has been inputted by the operator.

If the determination result in S42 is affirmative, the program proceeds to S44 in which deceleration control is performed to decrease the throttle opening $\theta$TH such that the vehicle velocity is decreased. The program then proceeds to S40 in which the desired vehicle velocity VD is updated to the velocity following the deceleration.

If, on the contrary, the determination result in S42 is negative, the program proceeds to S46 in which it is determined whether a preceding vehicle is approaching within the predetermined inter-vehicle distance. When the determination result in S46 is negative, the program proceeds to S48 in which cruise control is performed in accordance with the stored desired vehicle velocity VD, and when the determination result in S46 is affirmative, the program proceeds to S50 in which the preceding vehicle follow-up control is performed, in which the vehicle is controlled to run at a desired vehicle velocity to maintain a desired inter-vehicle distance from the preceding vehicle. The desired vehicle velocity is assigned with the same reference VD, but is frequently changed to maintain the desired distance.

Next, referring to FIG. 3, a general switching control operation between full-cylinder operation and cut-off-cylinder operation will be described.

Figure 3:
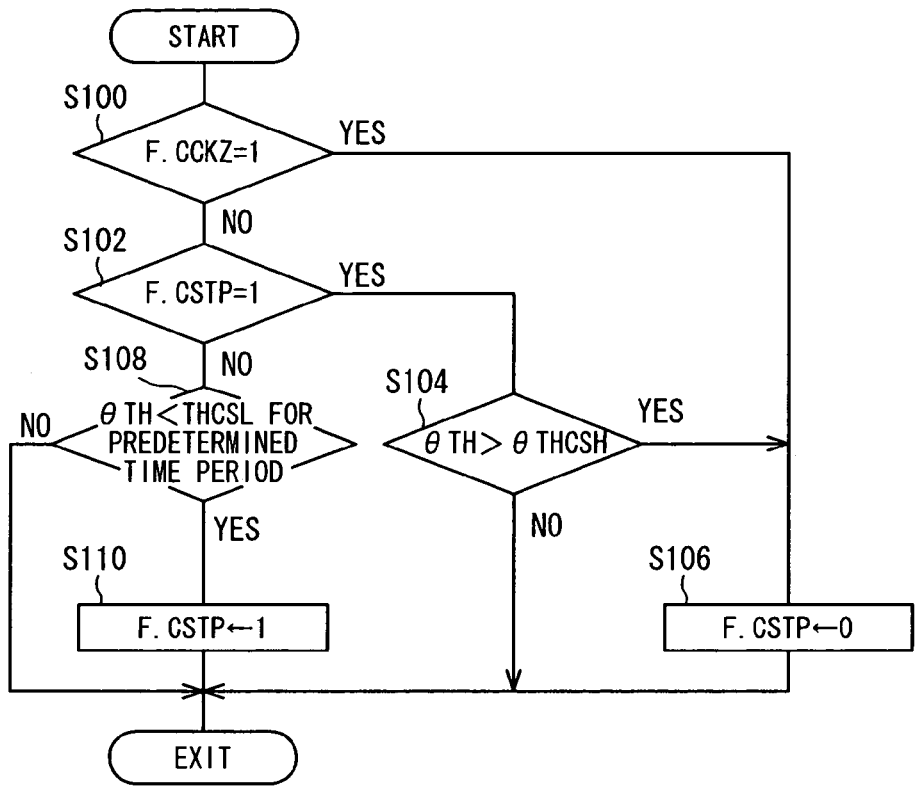
FIG. 3 is a flow chart showing an operation for general switching between full-cylinder operation and cut-off-cylinder operation from among of the operations of the system shown in FIG. 1.

FIG. 3 is a flow chart showing an operation for general switching between full-cylinder operation and cut-off-cylinder operation from among of the operations of the system shown in FIG. 1. The program illustrated in the diagram is also executed (looped) at TDC or a predetermined crank angle in the vicinity thereof, or at predetermined time intervals.

The program begins in S100 in which it is determined whether the bit of a flag F.CCKZ is set to 1. The bit of the flag F.CCKZ is set in a routine not shown by determining whether there is sufficient torque to maintain the current running state by distinguishing the behavior of the vehicle and engine load based on the engine speed NE, throttle opening $\theta$TH, manifold absolute pressure PBA, and so on. When the bit (initial value 0) is set to 1, it indicates that full-cylinder operation is required, and when the bit is reset to 0, it indicates that cut-off-cylinder operation is required.

When the determination result in S100 is negative, the program proceeds to S102 in which it is determined whether the bit of a flag F.CSTP (initial value 0) is set to 1. The bit of the flag F.CSTP is set in a manner as will be described below, and it indicates that the engine 10 should be operated by cut-off-cylinder operation when set to 1 and by full-cylinder operation when reset to 0.

Figure 4:
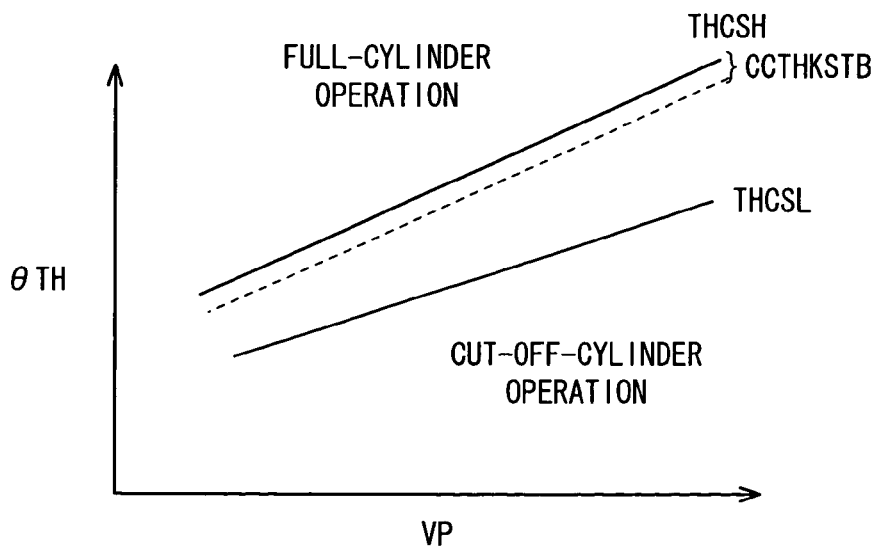
FIG. 4 is a graph showing respective characteristics of a full-cylinder-operation-switching throttle opening threshold value THCSH and a cut-off-cylinder-operation-switching throttle opening threshold value THCSL.

If the determination result in S102 is affirmative and it is judged that cut-off-cylinder operation is in progress, the program then proceeds to S104 in which the detected throttle opening $\theta$TH is compared with a full-cylinder-operation-switching throttle opening threshold value THCSH for determining whether the detected throttle opening is larger than the threshold value THCSH, in other words whether the load of the engine 10 is large. FIG. 4 shows a characteristic of the threshold value THCSH.

When the determination result in S104 is affirmative and it is determined that the load of the engine 10 is large, the program proceeds to S106 in which the bit of the flag F.CSTP is reset to 0 such that the engine 10 is operated by full-cylinder operation (switched to full-cylinder operation). If, on the other hand, the determination result in S104 is negative, the bit of the flag F.CSTP remains at 1 and cut-off-cylinder operation is continued.

If the determination result in S102 is negative and it is determined that full-cylinder operation is underway, the program proceeds to S108 in which the current throttle opening θTH is compared with a cut-off-cylinder-operation throttle opening threshold value THCSL for determining whether the condition that the detected value is less than the threshold value THCSL continues for a predetermined period of time (e.g., 0.5 sec.), in other words it is determined whether the load of the engine 10 remains small for the period of time. FIG. 4 also shows a characteristic of the threshold value THCSL. As illustrated, these threshold values are set to increase with increasing throttle opening θTH and with increasing vehicle velocity VP.

When the determination result in S108 is affirmative and it is determined that the load of the engine 10 remains small, the program proceeds to S110 in which the bit of the flag F.CSTP is set to 1 and the engine 10 is operated by cut-off-cylinder operation (switched to cut-off-cylinder operation). If the determination result in S108 is negative, the bit of the flag F.CSTP is kept reset as 0 and full-cylinder operation is continued. When the determination result in S100 is affirmative, since full-cylinder operation is required, the program proceeds to S106 in which the bit of the flag F.CSTP is reset to 0 and the engine 10 is operated by full-cylinder operation.

Next, an operation for specific switching from full-cylinder operation to cut-off-cylinder operation from among of the operations of the system shown in FIG. 1, more specifically an operation for determining a running condition where cut-off-cylinder operation is continuously possible so as to prevent a control hunting from happening, while ensuring to improve fuel consumption by utilizing cut-off-cylinder operation as much as possible.

Figure 5:
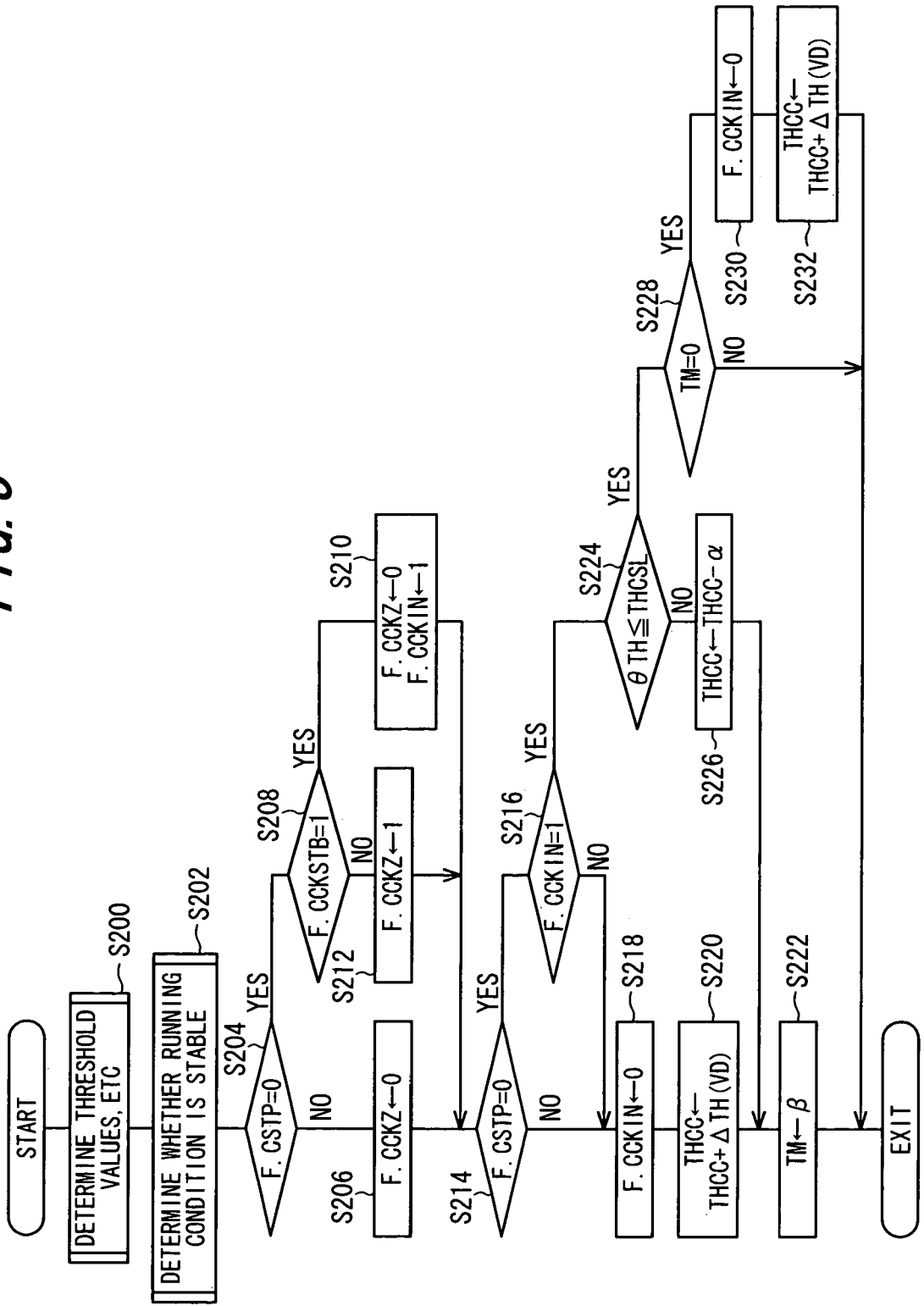
FIG. 5 is a flow chart showing an operation for specific switching from full-cylinder operation to cut-off-cylinder operation from among of the operations of the system shown in FIG. 1.

FIG. 5 is a flow chart of this operation. The program illustrated in the diagram is executed (looped) when the bit of the aforementioned flag F.AC is set to 1 (i.e., when running control is in progress), at TDC or a predetermined crank angle in the vicinity thereof, or at predetermined time intervals.

First, in S200, various threshold values (explained later), etc., are determined or set.

Figure 6:
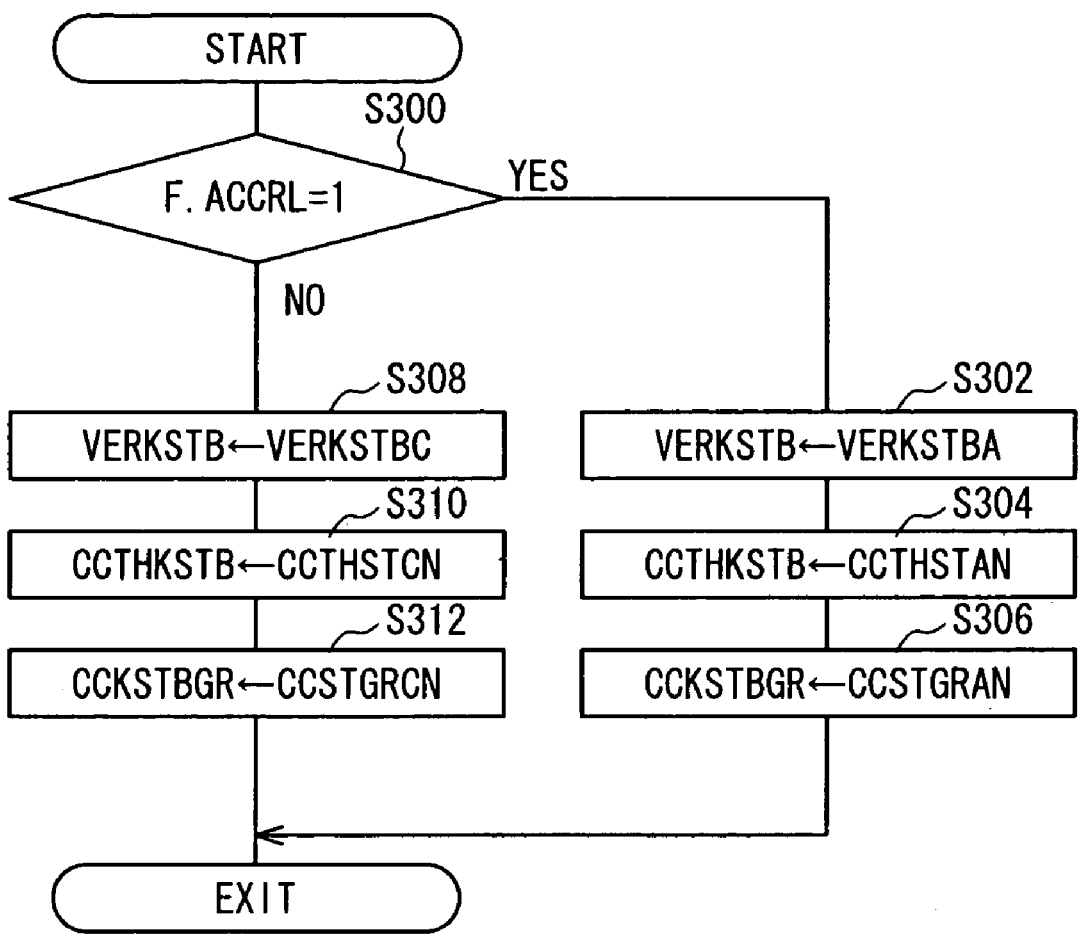
FIG. 6 is a flow chart showing the subroutine of determination of various threshold values referred to in the flow chart of FIG. 5.

FIG. 6 is a flow chart showing the subroutine of this.

In the flow chart, the program begins in S300 in which it is determined whether the bit of a flag F.ACCRL is set to 1. The bit of this flag is set to 1 in a routine not shown when preceding vehicle follow-up control is in progress.

When the result is affirmative, the program proceeds to S302 in which a velocity error threshold value VERKSTB is set to a value VERKSTBA (e.g., 1 km/h). The program then proceeds to S304 in which a parameter CCTHKSTB to be used for calculating a throttle opening threshold value (that is corresponding to a load threshold value (explained later)) is set to a value CCTHSTAN (e.g., 1 degree; more precisely one degree when the fully-opened degree of the throttle valve 22 is defined as 90 degrees). As will be explained later, this parameter CCTHKSTB is subtracted from the full-cylinder-operation-switching throttle opening threshold value THCSH and the throttle opening threshold value is determined or set.

The program then proceeds to S306 in which a road gradient threshold value CCKSTBGR (that is also corresponding to the load threshold value) is set to a value CCSTGRAN (e.g., 1.5%). The road gradient indicates the slope of a road on which the vehicles runs and is determined from a value obtained by dividing a height of the road (viewed from sideways) by a length (in the horizontal direction) and by multiplying the quotient by 100%. In this embodiment, the road gradient is determined by calculation as will be explained later.

On the other hand, when the result in S300 is negative, since this means that cruise control is in progress, the program proceeds to S308 in which the velocity error threshold value VERKSTB is set to a value VERKSTBC (e.g., 2 km/h), to S310 in which the parameter CCTHKSTB is set to a value CCTHSTCN (e.g., 0.5 degrees), and to S312 in which the road gradient threshold value CCKSTBGR is set to a value CCSTGRCN (e.g., 2%).

Thus, the velocity error threshold value and load threshold value, more specifically at least one of them is set to be different between when the cruise control is in progress and when the preceding vehicle follow-up control is in progress. This is because it suffices if the desired vehicle velocity VD is kept in cruise control, whist in addition thereto, a reserved force is required to follow up the preceding vehicle in preceding vehicle follow-up control. These threshold values and the parameter are values set beforehand and can be prepared as mapped data to be retrievable. Note that, although both of the velocity error threshold value and load threshold value are made different between when the cruise control is in progress and when the preceding vehicle follow-up control is in progress, it is alternatively possible to make at least one of them different depending on the kind of running control, since this can achieve the purpose to a fair extent.

Returning to the explanation of the flow chart of FIG. 5, the program then proceeds to S202 in which running condition is determined, more specifically it is determined whether it is under a stable running condition.

Figure 7:
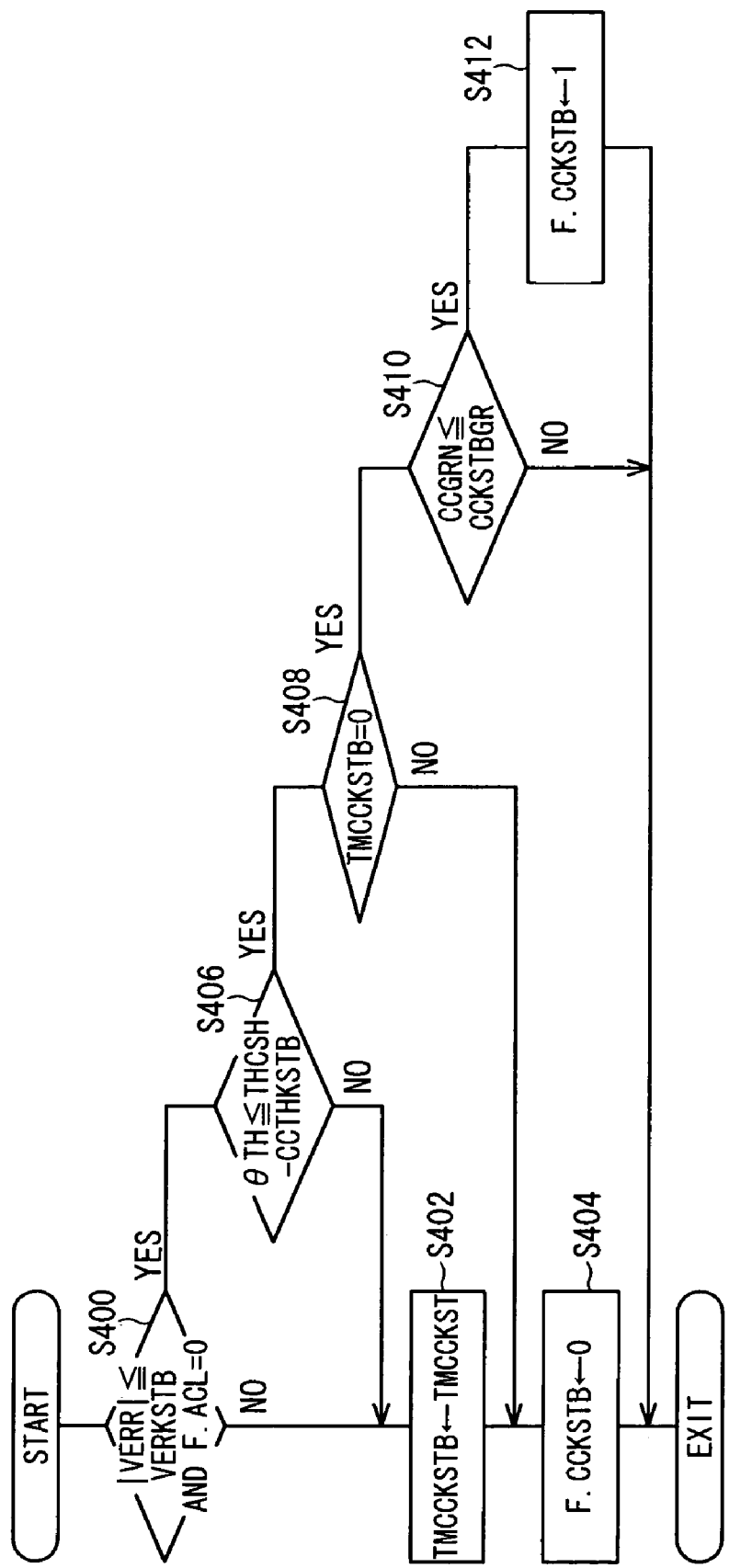
FIG. 7 is a flow chart showing the subroutine of determination of running condition referred to in the flow chart of FIG. 5.

FIG. 7 is a flow chart showing the subroutine for this.

The program begins in S400 in which a velocity error VERR (an error between the detected vehicle velocity VP and the desired vehicle velocity VD) is calculated and its absolute value is compared with the velocity error threshold value VERKSTB to determine whether the calculated velocity error is equal to or smaller than the threshold value. In addition, it is determined in this step whether the bit of a flag F.ACL is reset to 0.

In a routine not shown, the bit of the flag F.ACL is set to 1 when the accelerate switch 66d is made ON, or when acceleration control is in progress in preceding vehicle follow-up control, and otherwise, it is reset to 0. Accordingly, the processing in this step indicates to determine whether the calculated velocity error is equal to or smaller than the threshold value and whether the vehicle is not accelerating (more precisely not subject to the acceleration control).

When the result in S400 is negative, the program proceeds to S402 in which a timer TMCCKSTB (down-counter) is set with a predetermined value TMCCKST (e.g., a value corresponding to 5 sec.) to start count down (time measurement), and proceeds to S404 in which the bit of a flag F.CCKSTB (explained later) is reset to 0.

On the other hand, when the result in S400 is affirmative, the program proceeds to S406 in which the parameter CCTHKSTB is subtracted from the full-cylinder-operation-switching throttle opening threshold value THCSH to determine a difference (THCSH−CCTHKSTB) as the throttle opening threshold value (load threshold value), that is then compared with the detected throttle opening θTH and it is determined whether the detected throttle opening is equal to or smaller than the threshold value. In other words, it is determined in this step whether the load of the engine 10 is equal to or smaller than the load threshold value.

When the result in S406 is negative, the program proceeds to S402. On the contrary, when the result in S406 is affirmative, the program proceeds to S408 in which it is determined whether the value of the timer TMCCKSTB has reached zero, in other words, it is determined whether the running condition that the calculated velocity error is equal to or smaller than the threshold value, that the engine load is equal to or smaller than the load threshold value and that the vehicle 10 is not accelerating (not subject to the acceleration control), continues for the predetermined period of time (5 sec.).

When the result in S408 is negative, the program proceeds to S404. On the other hand, when the result in S408 is affirmative, the program proceeds to S410 in which the aforesaid road gradient CCGRN is determined and is compared with the road gradient threshold value (also load threshold value) CCKSTBGR to determine whether the determined road gradient is equal to or smaller than the threshold value. In other words, it is determined whether the load of the engine 10 is less than the threshold value by determining whether the determined road gradient CCGRN is less than the threshold value.

The road gradient (in %) is calculated using an equation mentioned below.

$$\text{gradient } (\%) \approx$$

$$\sin\theta \times 100 \approx \left[ \frac{\dfrac{\gamma \times \eta \times Te}{R} - \dfrac{\{VP(n) - VP(n-1)\} \times \{M + \Delta M\}}{\Delta t \times 9.8}}{M} - \mu - \dfrac{\lambda \times VP(n)^2 \times PA}{760 \times M} \right] \times 100$$

In the equation, γ: total gear-reduction ratio in the power transmission system; η: transmission efficiency; Te: generated torque [kg·m]; R: vehicle tire's dynamic radius [m]; VP(n): vehicle velocity [m/s] or [km/h] detected at a current time (detected at a current program loop); VP(n−1): vehicle velocity detected at a preceding time (detected at a preceding program loop); M: vehicle's weight [kg]; ΔM: equivalent mass of vehicle rotation system; Δt: elapsed period of time until VP(n) is detected after VP(n−1) was detected, i.e., program loop intervals of FIG. 5 flow chart [sec.]; μ: rolling resistance; and λ: drag coefficient.

As understood from the above, the value calculated from the equation becomes a positive value that increases with increasing upgrade of an uphill when the vehicle ascends the uphill, becomes zero when the vehicle runs on a level road, and becomes a negative value that increases with increasing downgrade of a downhill when the vehicle descends the downhill. Here, the absolute value of the calculated value is used as the road gradient CCGRN.

It should be noted that values corresponding to the control now in progress are used as the threshold values and the parameter in S400, S406 and S410 in the flow chart of FIG. 7.

When the result in S410 is affirmative, the program proceeds to S412 in which the bit of the flag is set to 1. Specifically when the velocity error is equal to or smaller than the velocity error threshold value and when the engine load is each equal to or smaller than the load threshold values, more specifically when it has been determined that the running condition that the calculated velocity error is equal to or smaller than the threshold value, that the engine load is respectively equal to or smaller than the load threshold values and that the vehicle 10 is not accelerating (not subject to the acceleration control), continues for the predetermined period of time (5 sec.), it is determined that the vehicle is under a stable running condition, i.e., the running condition will stay stable if engine operation is switched to cut-off-cylinder operation, and the bit of the flag F.CCKSTB is set to 1.

On the other hand, when the result in S410 is negative, the program skips S412. Thus, to set the bit of the flag F.CCKSTB to 1 indicates it is under the stable running condition, whilst to reset the bit of this flag to 0 indicates not.

Again returning to the explanation of the flow chart of FIG. 5, the program then proceeds to S204 in which it is determined whether the bit of the flag F.CSTP is reset to 0, in other words it is determined whether the engine 10 is under full-cylinder operation.

When the result in S204 is negative, the program proceeds to S206 in which the bit of the flag F.CCKZ is reset to 0, thereby indicating that what is required to the engine 10 is cut-off-cylinder operation. As a result, no operation changeover occurs. On the other hand, when the result in S204 is affirmative, the program proceeds to S208 in which it is determined whether the bit of the flag F.CCKSTB is set to 1, in other words, it is determined whether it is under the stable running condition.

When the result in S208 is affirmative, the program proceeds to S210 in which the bit of the flag F.CCKZ is reset to 0, while the bit of a flag F.CCKIN is set to 1. Specifically, although the engine 10 is under full-cylinder operation, since it can be judged that the running condition will stay stable if engine operation is switched to cut-off-cylinder operation, the operation required to the engine 10 is determined to be cut-off-cylinder operation so as to improve fuel consumption.

To be more specific, at a situation where running control is in progress, when it is determined to be under the stable running condition, the engine operation is switched to cut-off-cylinder operation. Here, to set the bit of the flag F.CCKIN to 1 indicates that a transient or transitional control from full-cylinder operation to cut-off-cylinder operation is in progress (changeover is in progress). In this transient control, throttle control to move the throttle valve 22 in a closing direction is performed as will be explained below.

When the result in S208 is negative, the program proceeds to S212 in which the bit of the flag F.CCKZ is set to 1 to indicate that the operation required to the engine 10 is full-cylinder operation. In other words, in this embodiment, it is prohibited to switch the engine operation to cut-off-cylinder operation unless it is under the stable running condition.

The program then proceeds to S214 in which it is determined whether the bit of the flag F.CSTP is reset to 0, i.e., it is again determined whether the engine 10 is under the full-cylinder operation. When the result in S214 is affirmative, the program proceeds to S216 in which it is determined whether the bit of the flag F.CCKIN is set to 1, in other words it is determined whether the transient control is in progress.

When the result in S216 is negative, since this means that engine operation is full-cylinder operation, but is not under the transient control from full-cylinder operation to cut-off-cylinder operation, the program proceeds to S218 in which the bit of the flag F.CCKIN is reset to 0. The program then proceeds to S220 in which a throttle opening change ΔTH is calculated such that the error between the desired vehicle speed VD and the detected vehicle speed VP decreases and is added to or subtracted from the desired throttle opening THCC to correct the same. The program then proceeds to S222 in which a timer (down-counter) TM is set with a predetermined value β (e.g., a value corresponding to 1 sec.) to start count down (time measurement).

On the other hand, when the result in S216 is affirmative, the program proceeds to S224 in which the detected throttle opening θTH is compared with the cut-off-cylinder-operation-switching threshold value THCSL (illustrated in FIG. 4) to determine whether the detected throttle opening is equal to or smaller than the threshold value. If it is immediately after the transient control, the result is normally negative and the program proceeds to S226 in which a predetermined value a is subtracted from the desired throttle opening THCC to correct the same. In other words, the throttle control is performed such that the throttle valve 22 is gradually closed to a predetermined throttle opening (more specifically THSCL). Then the program proceeds to S222.

When the result in S224 is affirmative, the program proceeds to S228 in which it is determined whether the value of the timer TM has reached zero, and when the result is negative, the program skips the other steps. Thus, a condition that the throttle opening θTH remains equal to or smaller than the cut-off-cylinder-operation-switching threshold value THCSL is kept for the predetermined period of time (1 sec). With this, in the flow chart of FIG. 3, after the period of time of 0.5 sec. has passed, the result in S108 becomes affirmative and the program proceeds to S110 in which engine operation is switched to cut-off-cylinder operation.

Here, the reason to keep such a condition for the predetermined period of time is that, if full-cylinder operation is required by a device of an automatic transmission or catalyst protection circuit other than the device of cruise control, i.e., the bit of the flag F.CCKZ is set to 1, in the flow chart of FIG. 3, since the result in S100 is affirmative and the program proceeds to S106, engine operation is not switched to cut-off-cylinder operation. This is disadvantageous. On the contrary, if the transient control is performed for a longer period of time, vehicle velocity drops. In view of the above, the period of time is limited to the predetermined value (i.e., 1 sec.).

In the flow chart of FIG. 5, when the result in S228 is affirmative, the program proceeds to S230 in which the bit of the flag F.CCKIN is reset to 0, and to S232 in which the throttle opening change ΔTH is calculated such that the error between the desired vehicle velocity VD and the detected vehicle velocity VP decreases, and the calculated value is added to or subtracted from the desired throttle opening THCC to correct the same.

Notably, when the result in S214 is negative, the program proceeds to S218 in which the bit of the flag F.CCKIN is reset to 0. As a result, even if the transient control is in progress, the transient control is discontinued. Thus, when the engine 10 is already under cut-off-cylinder operation, even if the transient control has not been completed, the transient control is stopped. The program then proceeds to S222, via S220 and is terminated.

This embodiment is thus configured to have a system for controlling an internal combustion engine 10 having a plurality of cylinders and mounted on a vehicle, operation of the engine being switchable, based on at least load of the engine, between full-cylinder operation during which all of the cylinders are operative and cut-off-cylinder operation during which some of the cylinders are non-operative (S10 to S50), and having a running controller (ECU 70, S10 to S50) that performs running control including at least one of cruise control during which the vehicle is controlled to run at a desired vehicle velocity and preceding vehicle follow-up control during which the vehicle is controlled to run at a desired vehicle velocity to maintain a desired inter-vehicle distance from a preceding vehicle, in response to an instruction of an operator, comprising: velocity error determiner (ECU 70, S200, S300 to S312, S400) that determines whether a velocity error (VEER) between a detected vehicle velocity VP and the desired vehicle velocity VD is equal to or smaller than a velocity error threshold value VERKSTB; load determiner (ECU 70, S200, S300 to S312, S406, S410) that determines whether load of the engine (throttle opening θTH, road gradient CCGRN) is equal to or smaller than a load threshold value (THCSH−CCTHKSTB, CCKSTBGR); running condition determiner (ECU 70, S202, S400 to 412) that determines that running condition of the vehicle is stable when the velocity error is equal to or smaller than the velocity error threshold value and when the load of the engine is equal to or smaller than the load threshold value; and engine operation controller (ECU 70, S100 to S110, S208, S210) that controls to switch the operation of the engine to the cut-off-cylinder operation if the running condition of the vehicle is determined to be stable when the running control is performed by the running controller.

With this, since the stable running condition is determined when running control is in progress, it becomes possible to continue cut-off-cylinder operation as long as possible so as to improve fuel consumption, while preventing a control hunting from happening.

In the system, the running condition determiner determines that the running condition of the vehicle is stable when the velocity error is kept equal to or smaller than the velocity error threshold value and when the load of the engine is kept equal to or smaller than the load threshold value for a predetermined period of time (TMCCKSTB; e.g. 5 sec.; ECU 70, S202, S400 to 412). With this, since the stable running condition is determined more appropriately, it becomes possible to continue cut-off-cylinder operation as long as possible so as to improve fuel consumption, while preventing a control hunting from happening.

In the system, the load threshold value is a throttle opening threshold value (THCSH−CCTHKSTB) defined by opening of a throttle valve 22 installed at an air intake system of the engine, and the load determiner determines that the load of the engine is equal to or smaller than the load threshold value when detected throttle opening θTH is equal to or smaller than the throttle opening threshold value. With this, it becomes possible to determine the load of the engine 10 by utilizing the throttle position sensor 24 normally installed thereat, and determine the stable running condition more easily and precisely.

In the system, the load threshold value is a road gradient threshold value (CCKSTBGR) defined by gradient of a road CCGRN on which the vehicle runs, and the load determiner determines that the load of the engine is equal to or smaller than the load threshold value when determined road gradient is equal to or smaller than the road gradient value. With this, it also becomes possible to determine the stable running condition more easily and precisely.

In the system, the running condition determiner determines that the running condition of the vehicle is stable when the velocity error is equal to or smaller than the velocity error threshold value, when the load of the engine is equal to or smaller than the load threshold value, and when the vehicle is determined to be not accelerating (ECU 70, S202, S400 to 412). With this, since the stable running condition is determined more appropriately, it becomes possible to continue cut-off-cylinder operation as long as possible so as to improve fuel consumption, while preventing a control hunting from happening.

In the system, the running condition determiner determines that the running condition of the vehicle is stable when the velocity error is kept equal to or smaller than the velocity error threshold value, when the load of the engine is kept equal to or smaller than the load threshold value, and when the vehicle is kept determined to be not accelerating for a predetermined period of time (TMCCKSTB; e.g. 5 sec.; ECU 70, S202, S400 to 412). With this, since the stable running condition is determined more appropriately, it becomes possible to continue cut-off-cylinder operation as long as possible so as to improve fuel consumption, while preventing a control hunting from happening.

In the system, the engine operation controller performs throttle control to close the throttle valve to a predetermined opening and then switches the operation of the engine to the cut-off-cylinder operation if the running condition of the vehicle is stable. With this, it becomes possible to switch to the cut-off-cylinder operation without producing shock due to change in torque.

In the system, the engine operation controller performs the throttle control to close the throttle valve gradually to the predetermined opening. With this, it becomes possible to switch to the cut-off-cylinder operation more smoothly without producing shock due to change.

In the system, the engine operation controller discontinues the throttle control when the operation of the engine has been switched to the cut-off-cylinder operation. With this, it becomes possible to prevent this control from being prolonged unnecessarily.

In the system, at least one of the velocity error threshold value and the load threshold value is made different between when the cruise control is in progress and when the preceding vehicle follow-up control is in progress. Since the value is set differently depending on the kind of running control, it becomes possible to determine the stable running condition more appropriately.

In the system, the engine operation controller prohibits switching of the operation of the engine to the cut-off-cylinder operation if the running condition of the vehicle is determined to be not stable. With this, it becomes possible to prevent a control hunting from happening in switching the operation of the engine, more surely.

It should be noted in the above that, although the road gradient is determined using the equation, it is alternatively possible to determine by installing a gradient sensor(s) on the vehicle and by using a value detected therefrom. It is still alternatively possible to use the technique proposed by the assignee to use a plurality of maps to determine whether the vehicle ascends/descends a hill or runs on a level road.

It should also be noted in the above that, although the throttle opening θTH is used as a parameter indicative of the load of the engine 10, a desired torque may instead be used. In an engine in which fuel is directly injected into cylinder, for example, in other words a spark ignition engine in which gasoline fuel is injected directly into a combustion chamber or a compression ignition engine, the desired torque is usually determined from the engine speed, accelerator position, and so on. In such a type of engine, the desired torque may be used in lieu of the throttle opening. The same also applies to electric vehicles and the like.

It should further be noted in the above that, although cruise control and preceding vehicle follow-up control (inter-vehicle distance control) are described as examples of running control, this invention may be applied to a case in which cruise control alone is performed.

Japanese Patent Application No. 2003-138720 filed on May 16, 2003, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling an internal combustion engine having a plurality of cylinders and mounted on a vehicle, operation of the engine being switchable, based on at least load of the engine, between full-cylinder operation during which all of the cylinders are operative and cut-off-cylinder operation during which some of the cylinders are non-operative, and having a running controller that performs running control including at least one of cruise control during which the vehicle is controlled to run at a desired vehicle velocity and preceding vehicle follow-up control during which the vehicle is controlled to run at a desired vehicle velocity to maintain a desired inter-vehicle distance from a preceding vehicle, in response to an instruction of an operator, comprising:

velocity error determiner that determines whether a velocity error between a detected vehicle velocity and the desired vehicle velocity is equal to or smaller than a velocity error threshold value;

load determiner that determines whether load of the engine is equal to or smaller than a load threshold value;

running condition determiner that determines that running condition of the vehicle is stable when the velocity error is equal to or smaller than the velocity error threshold value and when the load of the engine is equal to or smaller than the load threshold value; and engine operation controller that controls to switch the operation of the engine to the cut-off-cylinder operation if the running condition of the vehicle is determined to be stable when the running control is performed by the running controller.

2. The system according to claim 1, wherein the running condition determiner determines that the running condition of the vehicle is stable when the velocity error is kept equal to or smaller than the velocity error threshold value and when the load of the engine is kept equal to or smaller than the load threshold value for a predetermined period of time.

3. The system according to claim 1, wherein the load threshold value is a throttle opening threshold value defined by opening of a throttle valve installed at an air intake system of the engine, and the load determiner determines that the load of the engine is equal to or smaller than the load threshold value when detected throttle opening is equal to or smaller than the throttle opening threshold value.

4. The system according to claim 1, wherein the load threshold value is a road gradient threshold value defined by gradient of a road on which the vehicle runs, and the load determiner determines that the load of the engine is equal to or smaller than the load threshold value when determined road gradient is equal to or smaller than the road gradient value.

5. The system according to claim 1, wherein the running condition determiner determines that the running condition of the vehicle is stable when the velocity error is equal to or smaller than the velocity error threshold value, when the load of the engine is equal to or smaller than the load threshold value, and when the vehicle is determined to be not accelerating.

6. The system according to claim 5, wherein the running condition determiner determines that the running condition of the vehicle is stable when the velocity error is kept equal to or smaller than the velocity error threshold value, when the load of the engine is kept equal to or smaller than the load threshold value, and when the vehicle is kept determined to be not accelerating for a predetermined period of time.

7. The system according to claim 1, wherein the engine operation controller performs throttle control to close the throttle valve to a predetermined opening and then switches the operation of the engine to the cut-off-cylinder operation if the running condition of the vehicle is stable.

8. The system according to claim 7, wherein the engine operation controller performs the throttle control to close the throttle valve gradually to the predetermined opening.

9. The system according to claim 7, wherein the engine operation controller discontinues the throttle control when the operation of the engine has been switched to the cut-off-cylinder operation.

10. The system according to claim 1, wherein at least one of the velocity error threshold value and the load threshold value is made different between when the cruise control is in progress and when the preceding vehicle follow-up control is in progress.

11. The system according to claim 1, wherein the engine operation controller prohibits switching of the operation of the engine to the cut-off-cylinder operation if the running condition of the vehicle is determined to be not stable.

12. A method controlling an internal combustion engine having a plurality of cylinders and mounted on a vehicle, operation of the engine being switchable, based on at least load of the engine, between full-cylinder operation during which all of the cylinders are operative and cut-off-cylinder operation during which some of the cylinders are non-operative, and having a running controller that performs running control including at least one of cruise control during which the vehicle is controlled to run at a desired vehicle velocity and preceding vehicle follow-up control during which the vehicle is controlled to run at a desired vehicle velocity to maintain a desired inter-vehicle distance from a preceding vehicle, in response to an instruction of an operator, comprising the steps of:

determining whether a velocity error between a detected vehicle velocity and the desired vehicle velocity is equal to or smaller than a velocity error threshold value;

determining whether load of the engine is equal to or smaller than a load threshold value;

determining that running condition of the vehicle is stable when the velocity error is equal to or smaller than the velocity error threshold value and when the load of the engine is equal to or smaller than the load threshold value; and controlling to switch the operation of the engine to the cut-off-cylinder operation if the running condition of the vehicle is determined to be stable when the running control is performed.

13. The method according to claim 12, wherein the running condition determiner determines that the running condition of the vehicle is stable when the velocity error is kept equal to or smaller than the velocity error threshold value and when the load of the engine is kept equal to or smaller than the load threshold value for a predetermined period of time.

14. The method according to claim 12, wherein the load threshold value is a throttle opening threshold value defined by opening of a throttle valve installed at an air intake system of the engine, and the step of load determining determines that the load of the engine is equal to or smaller than the load threshold value when detected throttle opening is equal to or smaller than the throttle opening threshold value.

15. The method according to claim 12, wherein the load threshold value is a road gradient threshold value defined by gradient of a road on which the vehicle runs, and the step of load determining determines that the load of the engine is equal to or smaller than the load threshold value when determined road gradient is equal to or smaller than the road gradient value.

16. The method according to claim 12, wherein the step of running condition determining determines that the running condition of the vehicle is stable when the velocity error is equal to or smaller than the velocity error threshold value, when the load of the engine is equal to or smaller than the load threshold value, and when the vehicle is determined to be not accelerating.

17. The method according to claim 16, wherein the step of running condition determining determines that the running condition of the vehicle is stable when the velocity error is kept equal to or smaller than the velocity error threshold value, when the load of the engine is kept equal to or smaller than the load threshold value, and when the vehicle is kept determined to be not accelerating for a predetermined period of time.

18. The method according to claim 12, wherein the step of controlling performs throttle control to close the throttle valve to a predetermined opening and then switches the operation of the engine to the cut-off-cylinder operation if the running condition of the vehicle is stable.

19. The method according to claim 18, wherein the step of controlling performs the throttle control to close the throttle valve gradually to the predetermined opening.

20. The method according to claim 18, wherein the step of engine controlling discontinues the throttle control when the operation of the engine has been switched to the cut-off-cylinder operation.

21. The method according to claim 12, wherein at least one of the velocity error threshold value and the load threshold value is made different between when the cruise control is in progress and when the preceding vehicle follow-up control is in progress.

22. The method according to claim 12, wherein the step of controlling prohibits switching of the operation of the engine to the cut-off-cylinder operation if the running condition of the vehicle is determined to be not stable.

* * * * *